(12) United States Patent
Kodera et al.

(10) Patent No.: US 11,799,390 B2
(45) Date of Patent: Oct. 24, 2023

(54) SWITCHING DEVICE, SWITCHING POWER SUPPLY APPARATUS, AND VEHICLE HAVING ZERO-CROSSING POINT DETECTION TIME CORRECTION

(71) Applicant: Panasonic Intellectual Property Management Co., Ltd., Osaka (JP)

(72) Inventors: Yuji Kodera, Kanagawa (JP); Yuji Shibano, Tokyo (JP); Reiji Tominaga, Kanagawa (JP); Shuji Harimoto, Kanagawa (JP); Satoshi Tomie, Osaka (JP); Takao Miyamoto, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 249 days.

(21) Appl. No.: 17/215,837

(22) Filed: Mar. 29, 2021

(65) Prior Publication Data

US 2021/0305908 A1   Sep. 30, 2021

(30) Foreign Application Priority Data

Mar. 30, 2020  (JP) ................................. 2020-060588

(51) Int. Cl.
*H02M 7/06* (2006.01)
*B60L 53/22* (2019.01)
(Continued)

(52) U.S. Cl.
CPC ............. *H02M 7/062* (2013.01); *B60L 53/22* (2019.02); *H01H 9/56* (2013.01); *H02M 7/04* (2013.01)

(58) Field of Classification Search
CPC ....................................................... H02M 1/32
See application file for complete search history.

(56) References Cited

U.S. PATENT DOCUMENTS

| 7,929,323 B2 * | 4/2011 | Schmidt ................. H02M 7/062 |
| | | 363/125 |
| 2010/0078998 A1 * | 4/2010 | Wei ........................ H02M 5/458 |
| | | 307/31 |

(Continued)

FOREIGN PATENT DOCUMENTS

| CN | 103843227 A * | 6/2014 | ............. H02J 9/062 |
| CN | 203642333 U * | 6/2014 | |

(Continued)

OTHER PUBLICATIONS

Chinese Office Action, dated Jul. 18, 2023, for Chinese Patent Application No. 202110338482.1. (9 pages) (English translation).

(Continued)

*Primary Examiner* — Sisay G Tiku
(74) *Attorney, Agent, or Firm* — Seed IP Law Group LLP (57) ABSTRACT

A prevention switching device is provided. The apparatus includes a switching circuit and a controller. The switching circuit includes a switching relay capable of switching a connection destination of a first power conversion circuit other than a second power conversion circuit among the plurality of power conversion circuits between a phase corresponding to the first power conversion circuit and a certain phase of the external power supply. The second power conversion circuit corresponds to the certain phase of the external power supply. The controller controls an operation of the switching relay at a zero-crossing time of an AC voltage estimated based on the AC voltage.

19 Claims, 6 Drawing Sheets

(51) Int. Cl.
*H02M 7/04* (2006.01)
*H01H 9/56* (2006.01)
*H02M 1/32* (2007.01)

(56) References Cited

U.S. PATENT DOCUMENTS

| | | | | |
|---|---|---|---|---|
| 2012/0212984 | A1* | 8/2012 | Yamada | H02M 7/23 363/89 |
| 2014/0003832 | A1 | 1/2014 | Atarashi | |
| 2015/0109829 | A1* | 4/2015 | Usami | H02M 3/33573 363/17 |
| 2016/0268933 | A1* | 9/2016 | Kim | H02P 1/04 |
| 2019/0036462 | A1 | 1/2019 | Tazaki et al. | |
| 2020/0052606 | A1 | 2/2020 | Tazaki et al. | |

FOREIGN PATENT DOCUMENTS

| | | | | | |
|---|---|---|---|---|---|
| CN | 104518766 | A | * | 4/2015 | |
| CN | 208846637 | U | * | 5/2019 | |
| CN | 208861162 | U | * | 5/2019 | |
| CN | 209169960 | U | * | 7/2019 | |
| CN | 210443498 | U | * | 5/2020 | |
| DE | 102020126548 | A1 | * | 4/2021 | ............. H02M 1/32 |
| JP | H04127876 | A | * | 4/1992 | |
| JP | H08171843 | A | | 7/1996 | |
| JP | H10312725 | A | | 11/1998 | |
| JP | 2010074922 | A | | 4/2010 | |
| JP | 2014010307 | A | | 1/2014 | |
| JP | 2017-169350 | A | | 9/2017 | |
| JP | 2019-115150 | A | | 7/2019 | |
| KR | 20150142546 | A | * | 12/2015 | |
| WO | WO 2016051466 | A1 | | 4/2016 | |
| WO | WO-2020195060 | A1 | * | 10/2020 | |

OTHER PUBLICATIONS

Japanese Notice of Reasons for Refusal, dated May 24, 2023, for Japanese Patent Application No. 2020-060588. (5 pages) (English translation).

* cited by examiner

SWITCHING DEVICE, SWITCHING POWER SUPPLY APPARATUS, AND VEHICLE HAVING ZERO-CROSSING POINT DETECTION TIME CORRECTION

TECHNICAL FIELD

The present disclosure relates to a switching device, a switching power supply apparatus, and a vehicle.

BACKGROUND ART

Patent Literature 1 discloses a switching power supply apparatus with a plurality of power conversion circuits that convert an alternating current (AC) voltage supplied from an AC power supply into a direct current (DC) voltage. The switching power supply apparatus includes a switching circuit that switches between a phase of the AC power supply corresponding to each of the plurality of power conversion circuits and a phase common to the plurality of power conversion circuits.

CITATION LIST

Patent Literature

PTL 1
Japanese Patent Application Laid-Open No. 2017-169350

SUMMARY OF INVENTION

Solution to Problem

A switching device according to an embodiment of the present disclosure is a switching device provided with a plurality of power conversion circuits respectively corresponding to phases of a multiple-phase power supply as an external power supply. The switching device includes a switching circuit and a controller. The switching circuit includes a switching relay capable of switching a connection destination of a first power conversion circuit other than a second power conversion circuit among the plurality of power conversion circuits between a phase corresponding to the first power conversion circuit and a certain phase of the external power supply. The second power conversion circuit corresponds to the certain phase of the external power supply. The controller controls an operation of the switching relay at a zero-crossing time of an AC voltage estimated based on the AC voltage.

A switching power supply apparatus according to an embodiment of the present disclosure includes the switching device described above and the plurality of power conversion circuits.

A vehicle according to an embodiment of the present disclosure includes the switching power supply apparatus described above.

Advantageous Effects of Invention

According to an embodiment of the present disclosure, it is possible to build a switching device that prevents the occurrence of an inrush current flowing through a switching circuit without using an inrush current prevention circuit, and also possible to provide a switching power supply apparatus including the switching device, and a vehicle including the switching power supply apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, a preferred embodiment of the present disclosure will be described in detail with reference to the accompanying drawings. Note that components having substantially the same functions are denoted by the same reference signs in the present specification and drawings, and the repetitive descriptions thereof are omitted.

EMBODIMENT

Figure 1:
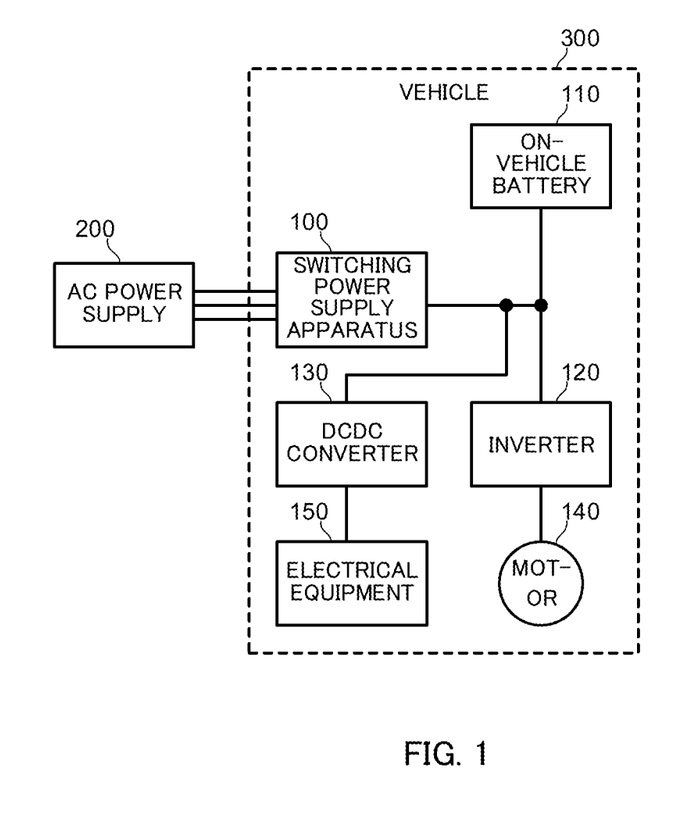
FIG. 1 illustrates a configuration of a vehicle according to an embodiment of the present disclosure.

FIG. 1 illustrates a configuration of a vehicle according to an embodiment of the present disclosure. Vehicle 300 is, for example, a passenger car, a truck, a bus, or a motorcycle. Vehicle 300 includes switching power supply apparatus 100, on-vehicle battery 110, electrical equipment 150, Direct Current to Direct Current (DCDC) converter 130, inverter 120, and motor 140.

Switching power supply apparatus 100 is a power conversion apparatus that converts an AC supplied from AC power supply 200 into a DC, and supplies the DC to on-vehicle battery 110. The configuration of switching power supply apparatus 100 will be described later in detail. Note that switching power supply apparatus 100 may be provided in, for example, aircrafts, game equipment, and uninterruptible power conversion circuits, besides vehicle 300.

AC power supply 200 includes, for example, a power supply mounted on quick charging equipment, and a commercial power supply. Types of AC power supply 200 include a single-phase AC power supply, a two-phase AC power supply, and a three-phase AC power supply, for example. On-vehicle battery 110 is a section for storing power to drive equipment mounted on vehicle 300 such as a traveling motor (a main motor) and electrical equipment 150. Examples of on-vehicle battery 110 are a lithium-ion battery and a nickel-metal hydride battery. Electrical equipment 150 includes, for example, a vehicle navigation system, audio equipment, an air conditioner, power windows, a defogger, an Electronic Control Unit (ECU), a Global Positioning System (GPS) module, and an in-vehicle camera.

Inverter 120 is a power conversion apparatus that converts a DC voltage into an AC voltage and supplies the AC voltage to the main motor.

Figure 2:
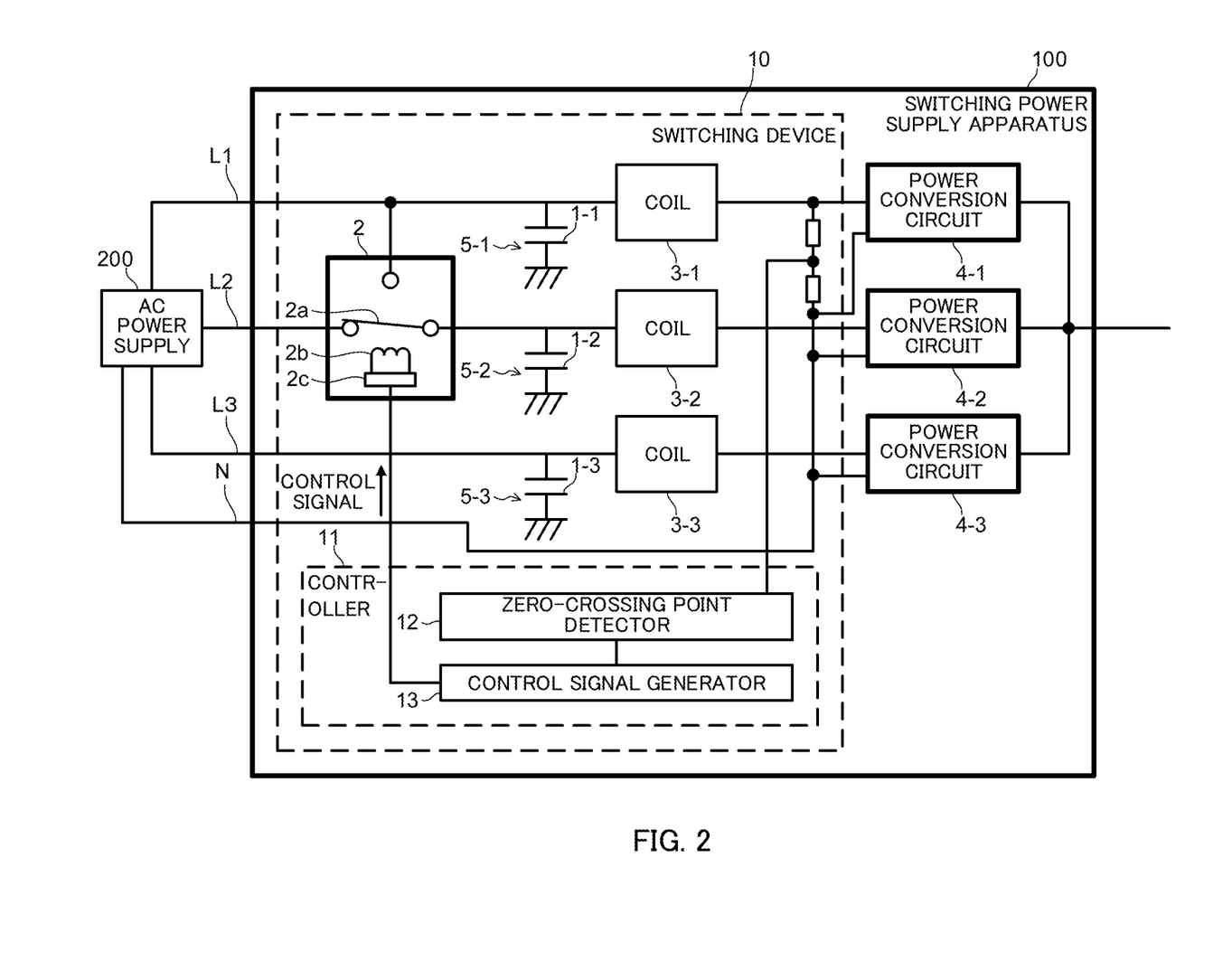
FIG. 2 illustrates an exemplary configuration of a switching power supply apparatus according to the embodiment of the present disclosure.

Next, an exemplary configuration of switching power supply apparatus 100 will be described with reference to FIG. 2. FIG. 2 illustrates the exemplary configuration of the switching power supply apparatus according to the embodiment of the present disclosure. Switching power supply apparatus 100 includes switching device 10, a plurality of power conversion circuits 4-1, 4-2, and 4-3, and controller 11. Hereinafter, the plurality of power conversion circuits will be collectively referred to as "power conversion circuit 4" when the plurality of power conversion circuits 4-1, 4-2, and 4-3 are not distinguished from each other.

Switching device 10 includes a plurality of noise filters 5-1, 5-2, and 5-3, and switching circuit 2. Hereinafter, the plurality of noise filters will be collectively referred to as "noise filter 5" when the plurality of noise filters 5-1, 5-2, and 5-3 are not distinguished from each other. Noise filter 5 is provided at a phase corresponding to each of the plurality of power conversion circuits 4-1, 4-2, and 4-3. Noise filter 5 is a noise removing section for preventing noise from entering from AC power supply 200 to power conversion circuit 4 and flowing out of power conversion circuit 4 into AC power supply 200.

Noise filter 5-1 provided on power supply line L1 includes capacitor 1-1 and coil 3-1. Power supply line L1 is an electric wire through which a single-phase current flows when AC power supply 200 is a single-phase AC power supply, and a U-phase (the first phase) current, for example, flows when AC power supply 200 is a three-phase AC power supply. Noise filter 5-2 provided on power supply line L2 includes capacitor 1-2 and coil 3-2. Power supply line L2 is an electric wire through which a single-phase current flows when AC power supply 200 is a single-phase AC power supply, and a V-phase (the second phase) current, for example, flows when AC power supply 200 is a three-phase AC power supply. Noise filter 5-3 provided on power supply line L3 includes capacitor 1-3 and coil 3-3. Power supply line L3 is an electric wire through which a W-phase (the third phase) current, for example, flows when AC power supply 200 is a three-phase AC power supply. Power supply line N is neutral and extends from AC power supply 200 to each of power conversion circuits 4.

Hereinafter, the capacitors will be collectively referred to as "capacitor 1" when capacitors 1-1, 1-2, and 1-3 are not distinguished from each other. Similarly, the coils will be collectively referred to as "coil 3" when coils 3-1, 3-2, and 3-3 are not distinguished from each other. Capacitor 1 includes an X capacitor and a Y capacitor, for example. Coil 3 includes a common mode choke coil and a normal mode choke coil, for example. Coil 3 is provided, for example, on the power conversion circuit 4 side of switching circuit 2.

Note that the location of coil 3 is not limited to the illustrated example, and may be on the AC power supply 200 side of switching circuit 2. However, when coil 3 is provided on the AC power supply 200 side of switching circuit 2, and switching relay 2a of switching circuit 2 is in a mode of connecting power supply line L1 of AC power supply 200 and power conversion circuit 4-2, the required rated current for the current flowing through coil 3-1 will be twice as much as that when coil 3 is provided on the power conversion circuit 4 side of switching circuit 2. Thus, providing coil 3 on the AC power supply 200 side of switching circuit 2 increases the rating of coil 3, and iron loss and copper loss of coil 3 accelerates heat generation. The iron loss of coil 3 also increases power loss. It is thus preferable to provide coil 3 on the power conversion circuit 4 side of switching circuit 2.

Switching circuit 2 is a switching section that switches a phase of AC power supply 200 for supplying an AC current to the plurality of power conversion circuits 4 between a phase corresponding to each of the plurality of power conversion circuits 4 and a phase common to the plurality of power conversion circuits 4.

Switching circuit 2 includes, for example, switching relay 2a, coil 2b, and driving circuit 2c. Driving circuit 2c amplifies a control signal to be inputted from controller 11 to a value sufficient to drive switching relay 2a, and applies the signal to coil 2b.

The control signal is a signal indicating a connection status of switching relay 2a, and includes a binary rectangular wave signal having a high level or a low level, for example. The application of the signal amplified in driving circuit 2c to coil 2b causes switching relay 2a to switch between a status of connecting to power supply line L1 and a status of connecting to power supply line L2. Note that switching circuit 2 is not limited to the mechanical switching circuit, and may be composed of a semiconductor switching element.

Power conversion circuit 4 includes, for example, an Alternating Current to Direct Current (ACDC) converter that converts an AC voltage into a DC voltage, and a DCDC converter that converts the DC voltage into a voltage of a predetermined value. Note that power conversion circuit 4 is not limited to be provided with both an ACDC converter and a DCDC converter, and may be provided with only an ACDC converter.

Controller 11 includes zero-crossing point detector 12 that detects a zero-crossing timing, i.e., a zero-crossing point (ZCP), of an AC voltage and control signal generator 13 that generates a control signal for driving switching relay 2a.

Figure 3:
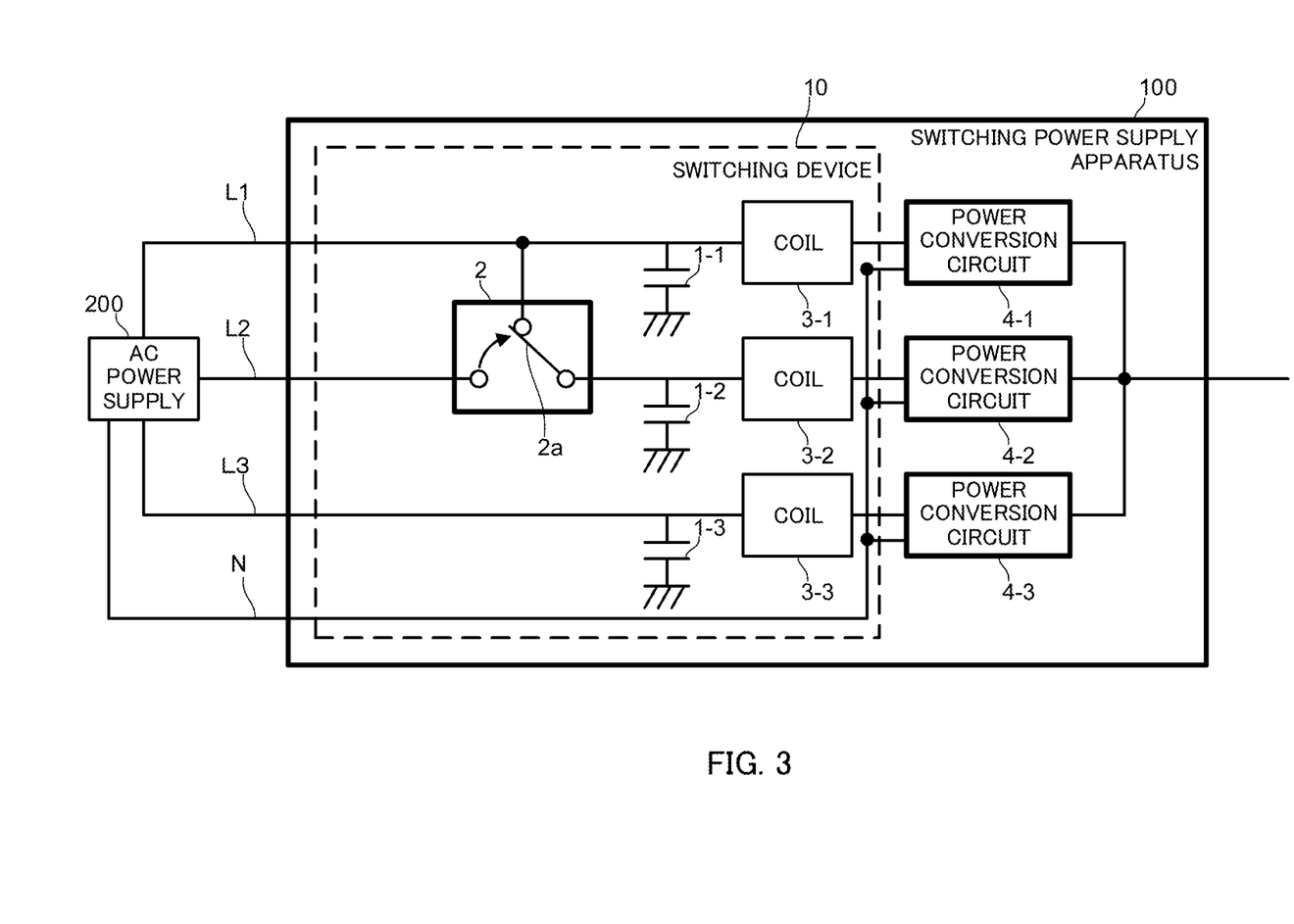
FIG. 3 is a diagram for describing an operation of the switching power supply apparatus.

Next, the operation of switching power supply apparatus 100 will be described with reference to FIGS. 2 and 3. FIG. 3 is a diagram for describing the operation of the switching power supply apparatus. When AC power supply 200 is a single-phase AC power supply, and switching relay 2a is in contact with power supply line L1 as illustrated in FIG. 3, the single-phase AC current flowing through power supply line L1 is distributed to coils 3-1 and 3-2 by switching circuit 2, and supplied to power conversion circuits 4-1 and 4-2. This enables to utilize a plurality of power conversion circuits 4 with a small rated capacity even when AC power supply 200 is a single-phase AC power supply, thereby increasing the rated capacity of the entire switching power supply apparatus 100.

Meanwhile, when AC power supply 200 is a three-phase AC power supply, and switching relay 2a is in contact with power supply line L2 as illustrated in FIG. 2, the first phase AC current flowing through power supply line L1 and the second phase AC current flowing through power supply line L2 are respectively supplied to power conversion circuits 4-1 and 4-2. This enables to utilize multiple power conversion circuits 4 and further increase the rated capacity of the entire switching power supply apparatus 100.

Incidentally, when a voltage of around a peak value of the AC power supply is applied to switching power supply apparatus 100, and switching relay 2a makes contact with power supply line L1 or power supply line L2 at the timing, for example, an inrush current (an overcurrent) flows in the contact of switching relay 2a and the contact may be worn out or broken.

Providing an inrush current prevention circuit to prevent such an overcurrent, however, increases the manufacturing cost of switching device 10A as well as makes it difficult to downsize switching device 10. Further, more components are required for switching device 10. This makes the configuration complicated and may reduce the reliability, which is not preferable.

Switching device 10 according to the present embodiment is configured so as to prevent, for example, the wear of switching relay 2a without providing the inrush current prevention circuit by controlling switching relay 2a to make contact with power supply line L1 or power supply line L2 around the zero-crossing timing of the AC voltage. Hereinafter, descriptions will be given of an operation of bringing switching relay 2a into contact with power supply line L1 or power supply line L2 around the zero-crossing timing of the AC voltage, with reference to FIG. 4, for example.

Figure 4:
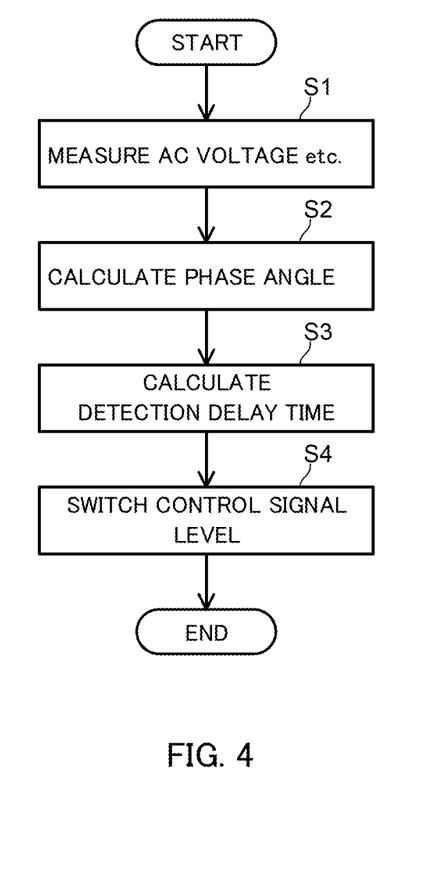
FIG. 4 is a flow chart illustrating a method of controlling a switching relay by a switching device according to the embodiment of the present disclosure.

FIG. 4 is a flow chart illustrating a method of controlling the switching relay by the switching device according to the present embodiment.

Control signal generator 13 inputs voltage information indicating a value of the AC voltage detected by a voltage detecter (not illustrated), and measures an effective value and a frequency of the AC voltage based on the voltage information (Step S1).

Next, control signal generator 13 calculates a phase angle θ [°] by Equation 1, using the effective value of the AC voltage, for example (Step S2). The phase angle is a phase difference between the AC voltage and an AC voltage detected in zero-crossing point detector 12. Vth in Equation 1 can be calculated by Equation 2. V_ATTpeak in Equation 1 can be calculated by Equation 3. Vth is an analog reference voltage (threshold) to be compared with the AC voltage, a ZCP of which is detected. A few tenths of the AC voltage are set as the analog reference voltage (threshold) because the AC voltage varies depending on the specification. V_ATTpeak is a value obtained by analog-converting the peak value of the AC voltage. Vrms is the effective value of the AC voltage. VOH is a power supply voltage of a comparator. The constant a is a correction coefficient for converting the effective value into a comparison value. The constant b is a correction coefficient for converting the power supply voltage into a comparison value. The constant c is a correction coefficient for converting the AC voltage into V_ATTpeak.

$$\theta = \arcsin\left(\frac{Vth}{V\_ATTpeak}\right) * \frac{180}{\pi}. \quad \text{(Equation 1)}$$

$$Vth = \{(a \times Vrms) + (b \times VOH)\} \times 10^{-3} \quad \text{(Equation 2)}.$$

$$V\_ATTpeak = (\sqrt{2} Vrms - 0.6) \times c \quad \text{(Equation 3)}.$$

Control signal generator 13 calculates a detection delay time (ZCP_Delay) by Equation 4 using the phase angle (Step S3). f is frequency of the AC power supply. The detection delay time is a time required from zero-crossing of the AC voltage to the zero-crossing point detection by zero-crossing point detector 12. The detection delay time occurs because zero-crossing point detector 12 performs filter processing to obtain a mean value of the AC voltage, for example, in a process of detecting the zero-crossing point of the AC voltage. This causes a time lag between the zero-crossing point of the AC voltage and the zero-crossing point detection by zero-crossing point detector 12.

$$ZCP\_Delay[sec] = \frac{\theta}{360°} \times \frac{1}{f}. \quad \text{(Equation 4)}$$

Control signal generator 13 calculates an output timing (SW relay EN) of a control signal for operating switching relay 2a by Equation 5, and switches the output of the control signal from a high level to a low level, for example, at the calculated output timing (Step S4).

$$SW \text{ relay } EN = ZCPdetect - (ZCP\_Delay + SW\_R\_delay) \quad \text{(Equation 5)}.$$

ZCPdetect in Equation 5 represents a zero-crossing point detection time, which is a detection time of the zero-crossing point by zero-crossing point detector 12.

SW_R_delay in Equation 5 is an operation delay time of switching relay 2a. The operation delay time is a time required from a point when the control signal is inputted to driving circuit 2c of switching circuit 2 to a point when switching relay 2a makes contact with power supply line L1 or power supply line L2. The operation delay time varies depending on, for example, the specification or manufacturing tolerance of switching circuit 2. Control signal generator 13 refers to, for example, table information respectively associating the specifications of a plurality of switching circuits 2 with the operation delay times, and table information associating a mean value of the manufacturing tolerances of the plurality of switching circuits 2 with the operation delay time. Control signal generator 13 then reads the operation delay time corresponding to, for example, the specification of switching relay 2a, and sets it to Equation 5. The table information may be stored in advance in a memory device of switching device 10, or distributed from an external equipment such as a center server.

Note that control signal generator 13 may calculate the output timing of the control signal by subtracting only the detection delay time from the zero-crossing point detection time. The output of the control signal at the calculated timing also enables switching relay 2a to make contact with power supply line L1 or power supply line L2 around the zero-crossing point, thereby reducing influence of the inrush current.

The switch timing of switching circuit 2 is ensured, however, by subtracting both the detection delay time and the operation delay time from the zero-crossing point detection time. This enables switching relay 2a to make contact with power supply line L1 or power supply line L2 at a timing even closer to the zero-crossing point, thereby further reducing the influence of the inrush current. It is thus preferable to configure control signal generator 13 so as to subtract both the detection delay time and the operation delay time from the zero-crossing point detection time.

Figure 5:
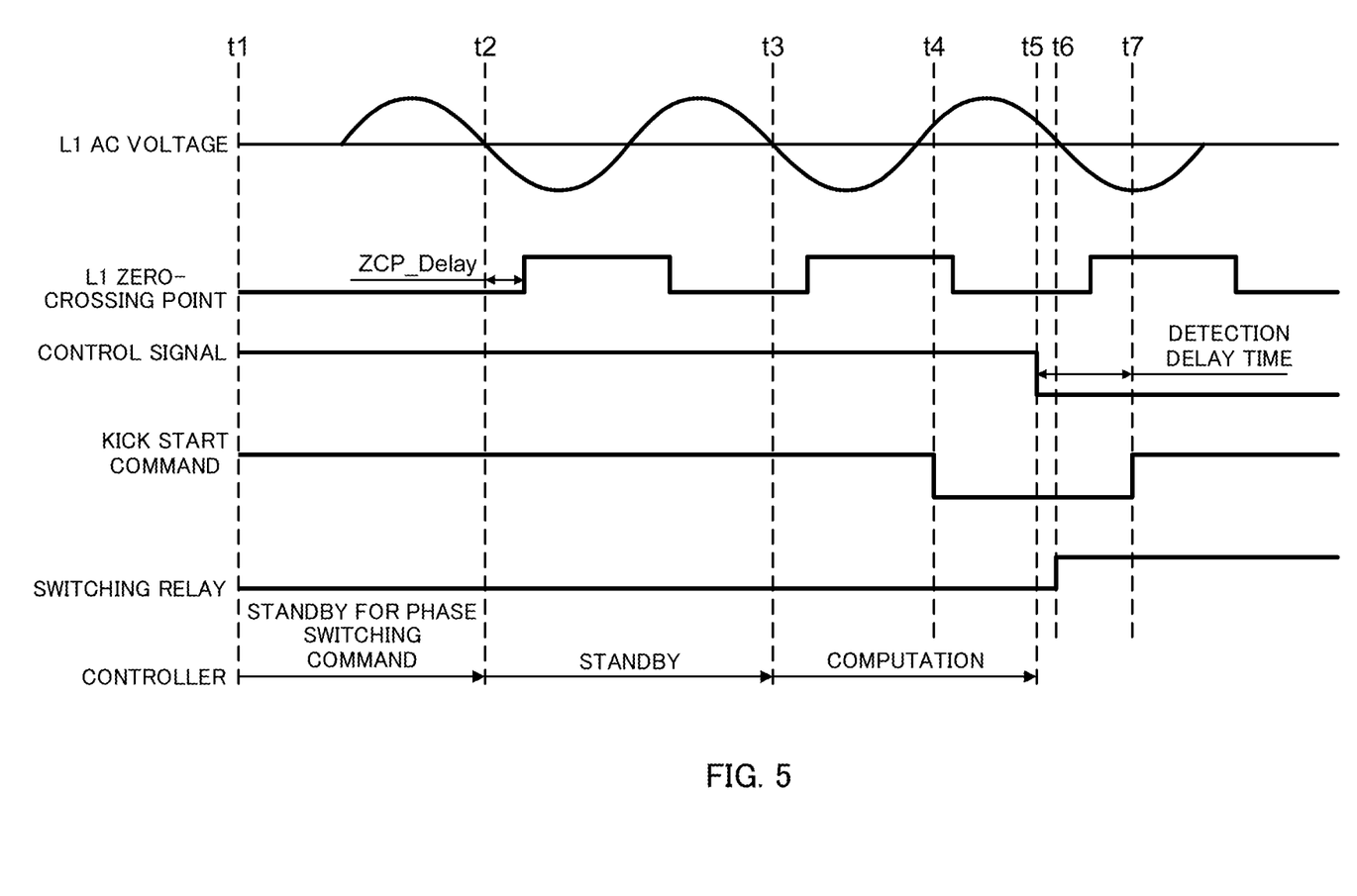
FIG. 5 is a timing chart illustrating an operation timing of the switching relay.

Next, an operation timing of switching relay 2a will be described in detail with reference to FIG. 5. FIG. 5 is a timing chart illustrating the operation timing of the switching relay. FIG. 5 illustrates an AC voltage of power supply line L1, detection timings of zero-crossing points of power supply line L1 by zero-crossing point detector 12, a status of a control signal, a status of a kick start command, an operation status of switching relay 2a, and an operation status of controller 11. The horizontal axis represents time.

For example, after switching power supply apparatus 100 is turned on, the time of which is represented as t1, control signal generator 13 waits for a phase switching command while measuring a voltage value of the AC voltage and frequency. The phase switching command is a command to be inputted from, for example, a phase switching application installed on an on-board device.

When the phase switching command is inputted at time t2, control signal generator 13 waits for a predetermined time until the effective value of the AC power supply becomes stable. The stand-by time is 1 [s], for example.

Control signal generator 13 starts the computation of the detection delay time described above at time t3 which is after the stand-by time passes. Note that the number of the computations is appropriately configured according to a specification of AC power supply 200 and a specification of a processor composing controller 11, for example.

Control signal generator 13 sets a kick start command "Active" (e.g., low level) at time t4 which is after a certain time passes from time t3. The kick start command is a signal determining whether to enable the output of the control signal from control signal generator 13. Note that the kick start command is held "Active" at least until the above-described detection delay time passes from time t5. The kick start is a function to apply a higher voltage than usual between coils when switching relay 2a is switched, so as to withstand the energy of the switching.

After completing the computation of the detection delay time, control signal generator 13 switches the output of the control signal from a high level to a low level at the output timing calculated by Equation 5, which is time t5. This causes switching relay 2a to make contact with power supply line L1 or power supply line L2 at time t6 which is after a certain time passes from time t5. Time t6 is around the zero-crossing point of the AC voltage as illustrated in FIG. 5, and this shows that switching relay 2a is switched around the zero-crossing point of the AC voltage.

Figure 6:
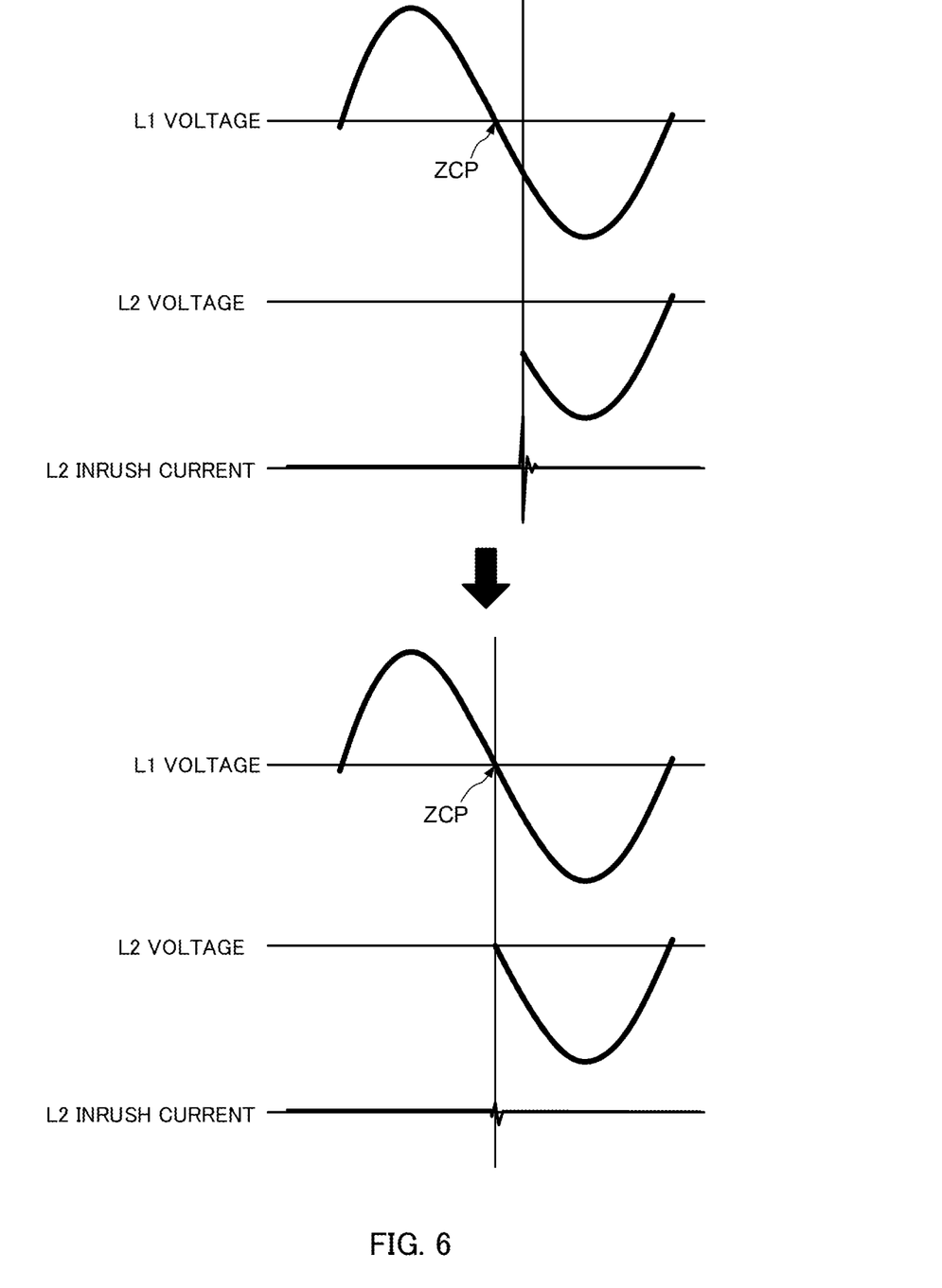
FIG. 6 illustrates an effect obtained when the switching relay is switched around a zero-crossing point.

FIG. 6 illustrates an effect obtained when the switching relay is switched around the zero-crossing point. FIG. 6 illustrates a waveform of an AC voltage applied to power supply line L1 (L1 voltage), a waveform of an AC voltage applied to power supply line L2 (L2 voltage), and an inrush current flowing through power supply line L2 (L2 current). The L2 current is an overcurrent caused by the switching of switching relay 2a.

The upper diagram of FIG. 6 illustrates a waveform of the inrush current flowing when switching relay 2a is switched a few msec, for example, after the zero-crossing point. The lower diagram of FIG. 6 illustrates a waveform of the inrush current flowing when switching relay 2a is switched around the zero-crossing point.

Controller 11 of the present embodiment calculates a detection delay time based on an AC voltage. The detection delay time is a time required from zero-crossing of the AC voltage to the detection of the zero-crossing point of the AC voltage by controller 11. Controller 11 then corrects a zero-crossing point detection time at which controller 11 has detected the zero-crossing point of the AC voltage using the detection delay time, and controls an operation of switching relay 2a at the corrected zero-crossing point detection time. This allows switching relay 2a to be switched around the zero-crossing point, and prevents the occurrence of an inrush current without using an inrush current prevention circuit.

Note that a plurality of capacitors 1 and coils 3 may be provided for a single power supply line, although the present embodiment has described a configuration example of providing a single capacitor 1 and a single coil 3 for a single power supply line. For example, one or more sets of capacitor 1 and coil 3 may be provided both on the AC power supply 200 side and the power conversion circuit 4 side of switching circuit 2. This further prevents noise from entering and flowing out.

Further, when a plurality of sets of capacitor 1 and coil 3 are provided for a single power supply line, all of the plurality of coils 3 are preferably provided on the power conversion circuit 4 side of switching circuit 2. This configuration enables to prevent power loss by coil 3 compared with the case of providing coil 3 on the AC power supply 200 side of switching circuit 2. Providing switching device 10 with such a configuration makes switching power supply apparatus 100 robust against noise while enhancing the power conversion efficiency.

As described above, switching device 10 according to the present embodiment is a switching device provided with a plurality of power conversion circuits respectively corresponding to phases of a multiple-phase power supply as an external power supply. The switching device includes a switching circuit and a controller. The switching circuit includes a switching relay capable of switching a connection destination of a first power conversion circuit other than a second power conversion circuit among the plurality of power conversion circuits between a phase corresponding to the first power conversion circuit and a certain phase of the external power supply. The second power conversion circuit corresponds to the certain phase of the external power supply. The controller controls an operation of the switching relay at a zero-crossing time of an AC voltage estimated based on the AC voltage.

This configuration enables to correct a zero-crossing point detection time even when detection delay occurs from the zero-crossing point of the AC voltage to the detection of the zero-crossing point, and to switch the switching relay around the zero-crossing point. This prevents the switching circuit from operating when, for example, a voltage of around a peak value of the AC power supply is applied to the switching power supply apparatus. Thus, it is possible to prevent the wear of the contact of the switching relay due to an inrush current without using an inrush current prevention circuit.

A coil of the present disclosure is a common mode choke coil.

The coil of the present disclosure is a normal mode choke coil.

At least one of the plurality of coils of the present disclosure is a common mode choke coil.

A power conversion circuit of the present disclosure includes an ACDC converter that converts an AC voltage into a DC voltage, and a DCDC converter that converts the DC voltage into a voltage of a predetermined value.

A switching circuit of the present disclosure is a mechanical switching circuit.

The switching circuit of the present disclosure is a semiconductor switching element.

An external power supply of the present disclosure is a single-phase AC power supply.

The external power supply of the present disclosure is a two-phase AC power supply.

The external power supply of the present disclosure is a three-phase AC power supply.

The external power supply of the present disclosure is a power supply mounted on quick charging equipment.

A noise filter of the present disclosure is a noise remover that prevents noise from entering from the external power supply to the power conversion circuit.

The noise filter of the present disclosure is a noise remover that prevents noise from flowing out of the power conversion circuit into the external power supply.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2020-060588, filed on Mar. 30, 2020, the disclosure of which including the specification, drawings and abstract is incorporated herein by reference in its entirety.

Although various embodiments have been described above with reference to the drawings, it goes without saying that the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

Although specific examples of the present disclosure have been described in detail above, these are merely illustrative and do not limit the scope of the claims. The art described in the claims includes various modifications and variations of the specific examples illustrated above.

INDUSTRIAL APPLICABILITY

An embodiment of the present disclosure is suitable for a parking assistance apparatus and a parking assistance system.

The invention claimed is:

1. A switching device provided with a plurality of power conversion circuits respectively corresponding to phases of a multiple-phase power supply as an external power supply, the switching device comprising:
   a switching circuit that includes a switching relay capable of switching a connection destination of a first power conversion circuit, different from a second power conversion circuit of the plurality of power conversion circuits, between a first phase corresponding to the first power conversion circuit and a second phase of the external power supply, the second power conversion circuit corresponding to the second phase of the external power supply; and
   a controller that controls an operation of the switching relay at a zero-crossing time of an AC voltage estimated based on the AC voltage,
   wherein the controller calculates, based on the AC voltage, a detection delay time from a zero-crossing of the AC voltage to detection of a zero-crossing point of the AC voltage by the controller, corrects a zero-crossing point detection time at which the controller has detected the zero-crossing point of the AC voltage using the detection delay time, and controls the operation of the switching relay at a corrected zero-crossing point detection time.

2. The switching device according to claim 1, wherein the controller corrects the zero-crossing point detection time using an operation delay time of the switching relay in addition to the detection delay time.

3. The switching device according to claim 1, further comprising a noise filter that includes a capacitor and a coil for removing noise, wherein the coil is provided on a side of the power conversion circuit of the switching circuit.

4. The switching device according to claim 3, wherein
   the noise filter includes a plurality of capacitors including the capacitor and a plurality of coils including the coil, and
   all of the plurality of coils are provided on the side of the power conversion circuit of the switching circuit.

5. The switching device according to claim 4, wherein at least one of the plurality of coils is a common mode choke coil.

6. The switching device according to claim 4, wherein at least one of the plurality of coils is a normal mode choke coil.

7. The switching device according to claim 3, wherein the coil is a common mode choke coil.

8. The switching device according to claim 3, wherein the coil is a normal mode choke coil.

9. The switching device according to claim 3, wherein the noise filter is a noise remover that prevents noise from entering from the external power supply to the power conversion circuit.

10. The switching device according to claim 3, wherein the noise filter is a noise remover that prevents noise from flowing out of the power conversion circuit into the external power supply.

11. The switching device according to claim 1, wherein the power conversion circuit includes an ACDC converter that converts an AC voltage into a DC voltage, and a DCDC converter that converts the DC voltage into a voltage of a predetermined value.

12. The switching device according to claim 1, wherein the switching circuit is a mechanical switching circuit.

13. The switching device according to claim 1, wherein the switching circuit is a semiconductor switching element.

14. The switching device according to claim 1, wherein the external power supply is a single-phase AC power supply.

15. The switching device according to claim 1, wherein the external power supply is a two-phase AC power supply.

16. The switching device according to claim 1, wherein the external power supply is a three-phase AC power supply.

17. The switching device according to claim 1, wherein the external power supply is a power supply mounted on quick charging equipment.

18. A switching power supply apparatus, comprising:
   the switching device according to claim 1; and
   the plurality of power conversion circuits.

19. A vehicle, comprising the switching power supply apparatus according to claim 18.

* * * * *